US011948575B2

(12) United States Patent
Gallagher et al.

(10) Patent No.: US 11,948,575 B2
(45) Date of Patent: Apr. 2, 2024

(54) DYNAMICALLY ASSIGNING MULTI-MODALITY CIRCUMSTANTIAL DATA TO ASSISTANT ACTION REQUESTS FOR CORRELATING WITH SUBSEQUENT REQUESTS

(71) Applicant: GOOGLE LLC, Mountain View, CA (US)

(72) Inventors: Andrew Gallagher, Fremont, CA (US); Caroline Pantofaru, San Carlos, CA (US); Vinay Bettadapura, San Jose, CA (US); Utsav Prabhu, Pittsburgh, PA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/096,446

(22) Filed: Jan. 12, 2023

(65) Prior Publication Data

US 2023/0169974 A1    Jun. 1, 2023

Related U.S. Application Data

(63) Continuation of application No. 17/548,972, filed on Dec. 13, 2021, now Pat. No. 11,557,295, which is a
(Continued)

(51) Int. Cl.
*G10L 15/22* (2006.01)
*G10L 15/24* (2013.01)
(Continued)

(52) U.S. Cl.
CPC .............. *G10L 15/22* (2013.01); *G10L 15/24* (2013.01); *H04R 1/406* (2013.01); *H04R 3/005* (2013.01);
(Continued)

(58) Field of Classification Search
CPC ......... G10L 15/22; G10L 15/24; G10L 15/20; G10L 2015/223; G10L 2015/228;
(Continued)

(56) References Cited

U.S. PATENT DOCUMENTS 9,098,467 B1   8/2015  Blanksteen et al.
11,037,562 B2  6/2021  Shah et al.
(Continued)

FOREIGN PATENT DOCUMENTS

WO   WO-2018213415 A1 * 11/2018 ............ G06F 21/32
WO   2019089108          5/2019

OTHER PUBLICATIONS

European Patent Office; International Search Report and Written Opinion of Ser. No. PCT/US2019/034930; 15 pages; dated Feb. 13, 2020.

*Primary Examiner* — Yogeshkumar Patel
(74) *Attorney, Agent, or Firm* — Gray Ice Higdon (57) ABSTRACT

Implementations set forth herein relate to an automated assistant that uses circumstantial condition data, generated based on circumstantial conditions of an input, to determine whether the input should affect an action been initialized by a particular user. The automated assistant can allow each user to manipulate their respective ongoing action without necessitating interruptions for soliciting explicit user authentication. For example, when an individual in a group of persons interacts with the automated assistant to initialize or affect a particular ongoing action, the automated assistant can generate data that correlates that individual to the particular ongoing action. The data can be generated using a variety of different input modalities, which can be dynamically selected based on changing circumstances of the individual. Therefore, different sets of input modalities can
(Continued)

be processed each time a user provides an input for modifying an ongoing action and/or initializing another action.

20 Claims, 5 Drawing Sheets

Related U.S. Application Data continuation of application No. 16/613,686, filed as application No. PCT/US2019/034930 on May 31, 2019, now Pat. No. 11,200,898.

(51) Int. Cl.
*H04R 1/40* (2006.01)
*H04R 3/00* (2006.01)

(52) U.S. Cl.
CPC .. *G10L 2015/223* (2013.01); *G10L 2015/228* (2013.01)

(58) Field of Classification Search
CPC ......... H04R 1/406; H04R 3/005; G06F 3/167; G06F 3/013; G06F 21/31; G06F 21/32
See application file for complete search history.

(56) References Cited

U.S. PATENT DOCUMENTS

| | | |
|---|---|---|
| 11,200,898 B2 | 12/2021 | Gallagher et al. |
| 2012/0245941 A1* | 9/2012 | Cheyer ............... H04L 63/0861 704/E15.004 |
| 2014/0249817 A1 | 9/2014 | Hart et al. |
| 2014/0330560 A1* | 11/2014 | Venkatesha ............. G06F 21/32 704/235 |
| 2018/0293981 A1* | 10/2018 | Ni ........................... G10L 17/22 |
| 2020/0302924 A1 | 9/2020 | Andreica et al. |
| 2022/0101854 A1 | 3/2022 | Gallagher et al. |

* cited by examiner

FIG. 4

DYNAMICALLY ASSIGNING MULTI-MODALITY CIRCUMSTANTIAL DATA TO ASSISTANT ACTION REQUESTS FOR CORRELATING WITH SUBSEQUENT REQUESTS

BACKGROUND

Humans may engage in human-to-computer dialogs with interactive software applications referred to herein as "automated assistants" (also referred to as "digital agents," "chatbots," "interactive personal assistants," "intelligent personal assistants," "conversational agents," etc.). For example, humans (which when they interact with automated assistants may be referred to as "users") may provide commands and/or requests using spoken natural language input (i.e., utterances) which may in some cases be converted into text and then processed, and/or by providing textual (e.g., typed) natural language input.

In some instances, an automated assistant may operate in a variety of different contexts in which multiple different users are present and attempting to interact with the automated assistant. However, because of a lack of versatility of some automated assistants, guest users seeking to interact with automated assistants (e.g., to retrieve public data and/or invoke non-access restricted actions) may experience issues interacting with the automated assistants. For instance, a guest user who provides a request for an alarm go off at a particular time may not be designated as the only user with permission to modify the alarm. As a result, other guest users may be able to modify the alarm before the alarm goes off. These circumstances can be exacerbated when multiple guest users are attempting to edit certain respective actions they have initialized, but the automated assistant is unclear as to which user is attempting to modify a particular ongoing action. As a result, computational resources can be wasted when actions are misidentified and modified inadvertently. Furthermore, when a user provides subsequent commands for directing the automated assistant to an affected action, additional computational resources can be wasted.

SUMMARY

Implementations set forth herein relate to an automated assistant that uses instances of circumstantial conditions in order to initialize and/or modify certain actions requested by a user. The automated assistant can use circumstantial conditions to identify a user that is providing a particular input, and correlating the particular input to an action that was previously initialized under similar circumstantial conditions. In circumstances in which the automated assistant is going to receive inputs from different users (e.g., "guest" users) in order to initialize different actions, the automated assistant can dynamically select modalities for detecting circumstantial conditions associated with the different users, as a context of such users' changes. In this way, computational resources can be preserved by providing a variety of combinations of modalities that can be used to correlate a user to an action. Furthermore, by allowing the automated assistant to dynamically select modalities for correlating a user to an ongoing action, errors that arise from incorrectly assigning user commands to actions requested by other users can be mitigated. Mitigating such errors can further preserve computational resources that might otherwise be consumed when correcting any actions that are inadvertently initialized by such incorrect assignments.

Implementations set forth herein relate to an automated assistant that orchestrates various inputs from different users according to circumstances in which such inputs are provided. In some implementations, various circumstantial conditions can be correlated to a particular user and/or a particular action requested by that particular user. In this way, any subsequent inputs can be correlated to previous circumstantial conditions in order for the automated assistant to generate a suitable response without delaying the response by, for example, requesting that the non-authenticated user authenticate themselves. This practice of bypassing explicit authentications that would otherwise be requested in response to certain user inputs can mitigate latency that can be exhibited between a request from a user and a responsive action from the automated assistant (e.g., an audible and/or graphical response and/or controlling of a smart device). Furthermore, this practice can be especially useful in situations in which multiple users are interacting with the same automated assistant but not requesting performance of any actions that uses private data.

For example, while a first guest user is within a home of another user, the first guest user can invoke an automated assistant from a computing device within the home of the other user in order to create reminders for later in the day. In order to create the reminders, the first guest user can provide a spoken utterance such as, "Assistant, remind me to call my Dad at 3:00 PM today." In response, the automated assistant can cause circumstantial data to be generated to characterize any circumstantial conditions in which the first guest user provided the spoken utterance, as well as reminder data characterizing the requested reminder. Furthermore, the automated assistant can cause the circumstantial data and the reminder data to be stored (e.g., at the computing device) in correlation with each other.

The circumstantial conditions characterized by the circumstantial data can include a trajectory in which the first guest user was walking when the spoken utterance was provided by the guest user. The trajectory can be determined using audio data generated based on audio input to a microphone array that is connected to the computing device. The circumstantial conditions characterized by the circumstantial data can additionally or alternatively include image data characterizing an appearance of the first guest user when the spoken utterance was provided by the guest user. The image data can include an image itself, and/or a signature or embedding generated based on processing the image (e.g., using a face recognition machine learning model). The circumstantial conditions characterized by the circumstantial data can additionally or alternatively include voice data, which can include a signature or embedding generated based on processing the spoken utterance (e.g., using a voice recognition machine learning model). Any signatures or embeddings can be generated based on receiving permission from the first guest user, and/or can optionally be transiently stored (e.g., locally on the computing device) for a short duration (e.g., until a corresponding action is completed and/or for a threshold duration of time). In these and other manners, the circumstantial data can be used for determining a signature and/or embedding for use when determining whether a subsequent input to the automated assistant is being provided by the first guest user.

For example, another second guest user can provide a subsequent input to the automated assistant such as, "Assistant, push my reminder back an hour." Because of the relevance of subsequent input to the spoken utterance provided by the first guest user, the computing device might otherwise cause the reminder for the first guest user to be modified. However, the automated assistant can identify one or more circumstantial conditions corresponding to the subsequent input in order to ensure that the correct reminder is modified per the subsequent input. For instance, the automated assistant can determine, e.g. with permission from the second guest user, that an appearance of the second guest user correlates to circumstantial data stored in association with a previous input provided by the second guest user. An appearance of the second guest user can correlate to circumstantial data stored in association with the previous input when at least one feature of the appearance of the second guest user is shared with at least one feature of the previous input (e.g. when the second guest user is currently standing in the same location that they were standing when a previous image of the room was captured).

Additionally, or alternatively, the automated assistant can determine that a voice signature of the second guest user also correlates to the circumstantial data that is stored in association with the previous input provided by the second guest user. Based on the correlation(s), the automated assistant can access action data corresponding to the reminder action previously requested by the second guest in order that the automated assistant can affect changes to the appropriate action data. For instance, in response to the subsequent input from the second guest user, and based on the correlation between the appearance of the second guest user and/or voice signature of the second guest user, the automated assistant can modify the action data, such that the corresponding reminder is pushed "back an hour" in accordance with the input from the second guest user, thereby avoiding inadvertently modifying the reminder of the first guest user.

In some implementations, a first user and a second user (e.g., guest users) can be interacting with an automated assistant in a kitchen area of their home in order that they might each be individually guided through steps of their respective recipes. As an example, the first user can be making an appetizer using an appetizer recipe being detailed via the automated assistant, and the second user can be making an entrée using an entrée recipe that is simultaneously being accessed by the automated assistant. While interacting with the automated assistant and cooking their respective food items, each user can be moving about the kitchen area and changing their orientation with respect to a computing device through which the automated assistant is being accessed. Therefore, in order to identify a user that is providing an input to the automated assistant at any given time, the automated assistant can selectively process data generated according to one or more input modalities.

As an example, when the first user provides a spoken utterance such as, "Assistant, how much flour does my recipe call for?" the automated assistant can, with permission from the first user and the second user, process one or more images captured by the computing device when the first user provided the spoken utterance. Furthermore, the automated assistant can process audio data characterizing at least a portion of the spoken utterance. The one or more images and/or the audio data can be processed to identify a correlation between features of circumstantial conditions in which the first user provided the spoken utterance and any other circumstantial conditions in which a previous action was requested.

In order to identify the correlation between features of the circumstantial conditions in which the first user provided the spoken utterance and the previous action was requested by the first user (e.g., "Assistant, render my appetizer recipe at the computing device."), data generated using one or more input modalities can be processed. The data can characterize circumstantial conditions in which the first user provided the latest spoken utterance to the automated assistant, and other circumstantial conditions in which the first user provided a previous spoken utterance to the automated assistant. For example, image data, captured when the first user provided the previous spoken utterance and the latest spoken utterance, can characterize a silhouette (e.g., the second user) that is turned away from the computing device. Furthermore, audio data captured by a microphone array connected to the computing device can indicate that a direction from which the previous spoken utterance and the latest spoken utterance were provided does not correspond to the location of the silhouette. Therefore, because both spoken utterances are determined to have not been provided by the person/silhouette in the images, but, rather, someone standing outside a field of view of the camera, the automated assistant can determine that the spoken utterances are from the same person (e.g., the first user).

Furthermore, in order to generate an accurate response to the latest spoken utterance from the first user, the automated assistant can determine whether there is a previously performed action that was requested by the first user, and then correlate the latest spoken utterance to that previous action. For instance, the previously performed action could include causing the automated assistant to render the appetizer recipe at a display interface of the computing device. Therefore, based on a correlation between the latest spoken utterance (e.g., "Assistant, how much flour does my recipe call for?") and the content of the previously performed action (e.g., natural language content of the appetizer recipe), the automated assistant can respond to the first user with data that is based on the appetizer recipe. In this way, operations related to requesting the first user (i.e., a non-authenticated user) to perform an authentication step can be bypassed, thereby further preserving computational resources, as well as mitigating latency between the first user providing the spoken utterance and the automated assistant providing a response (e.g., "The appetizer recipe calls for 2 cups of flour.").

The above description is provided as an overview of some implementations of the present disclosure. Further description of those implementations, and other implementations, are described in more detail below.

Other implementations may include a non-transitory computer-readable storage medium storing instructions executable by one or more processors (e.g., central processing unit(s) (CPU(s)), graphics processing unit(s) (GPU(s)), and/or tensor processing unit(s) (TPU(s)) to perform a method such as one or more of the methods described above and/or elsewhere herein. Yet other implementations may include a system of one or more computers that include one or more processors operable to execute stored instructions to perform a method such as one or more of the methods described above and/or elsewhere herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1A:
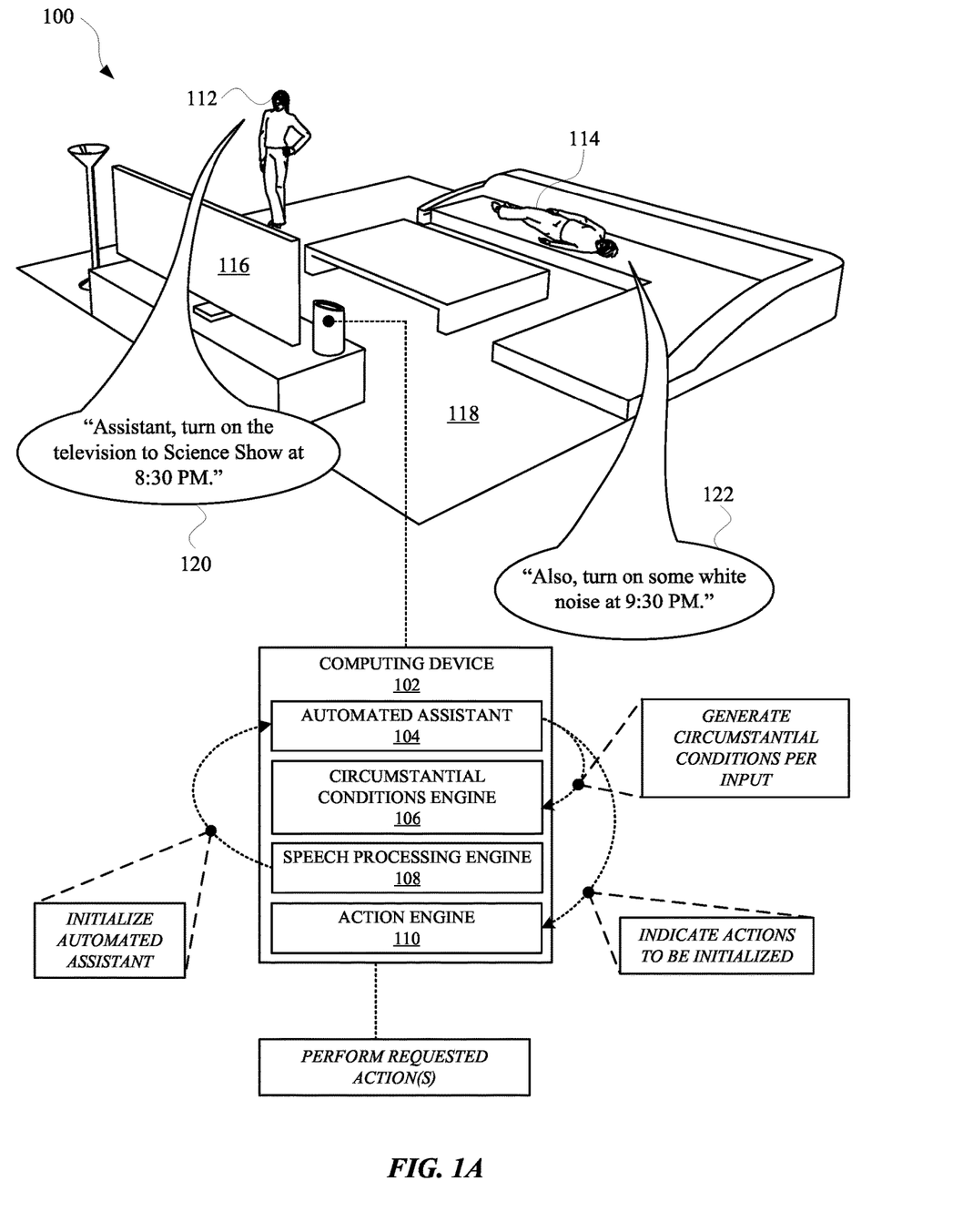
FIG. 1A and FIG. 1B illustrate an automated assistant that correlates requested actions to certain circumstantial conditions in order to bypass explicit authentication for each request.
Figure 1B:
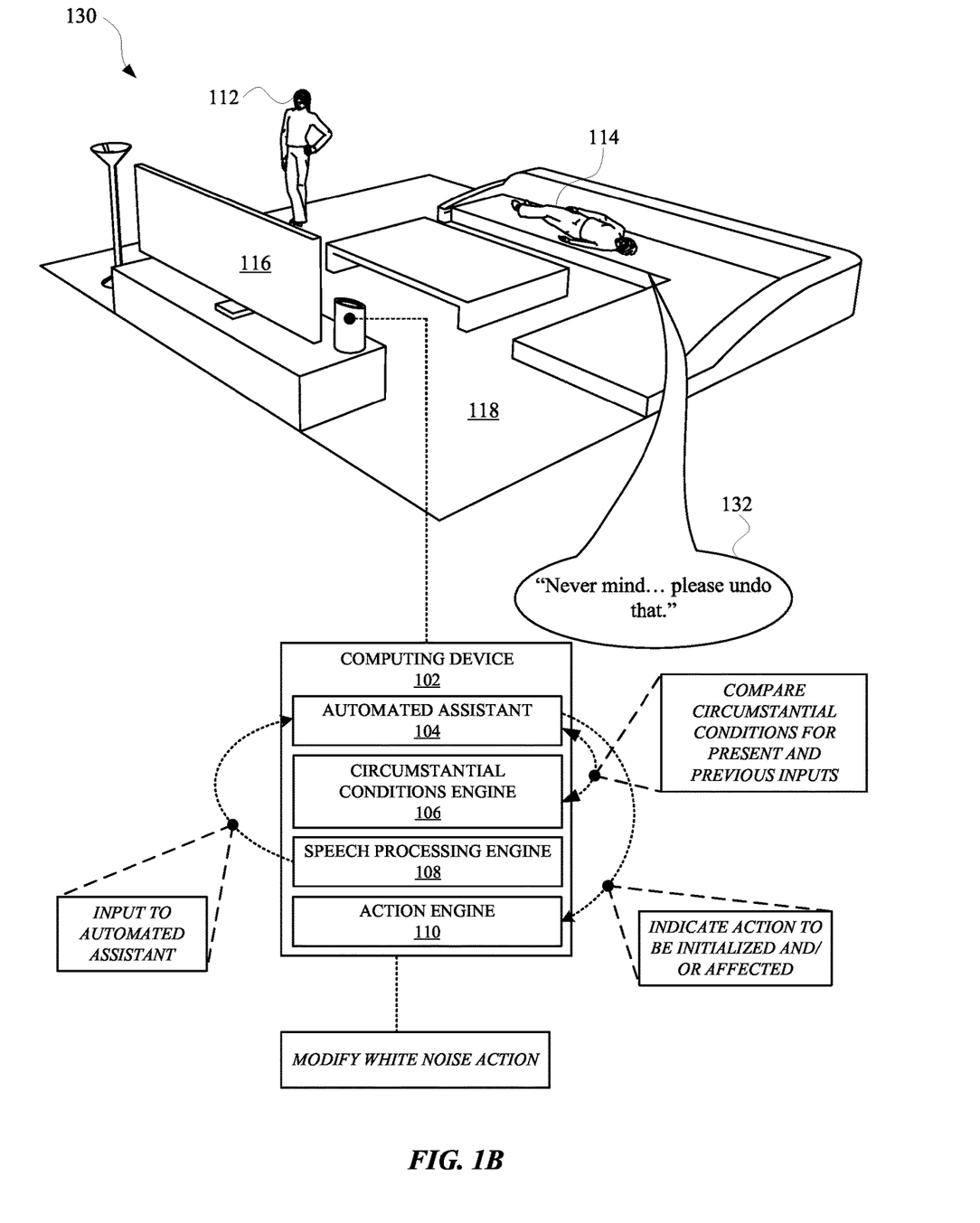

FIG. 1A and FIG. 1B illustrate a view 100 and a view 130, respectively, of an automated assistant 104 that correlates requested actions to certain circumstantial conditions in order to bypass explicit authentication for each request. The automated assistant 104 can be available and/or accessible via a computing device 102, which include one or more automated assistant interfaces, such as one or more microphones and/or one or more display devices. A first user 112 and a second user 114 can interact with the automated assistant 104 through spoken inputs, which can be processed by a speech recognition module 108 of the computing device 102. Because each user may wish to modify their respective requested actions, the automated assistant 104 can bypass soliciting each user for express authentication in response to each respective user input.

As an example, the first user 112 can provide a spoken utterance 120 such as, "Assistant, turn on the television to Science Show at 8:30 PM EST," in order to cause the automated assistant 104 to activate a television 116 at a particular time and render a particular show. The first user 112 can provide the spoken utterance 120 while standing at an angle from the computing device 102 in a room 118. In response to receiving the spoken utterance 120, the computing device 102 can employ a speech processing engine 108 to process audio data that is generated by the computing device 102 for characterizing the spoken utterance 120. The speech processing engine 108 can determine that the first user 112 provided an invocation phrase (e.g., "Assistant . . . "), and, in response, cause the automated assistant 104 to be initialized at the computing device 102.

The computing device 102 can cache data characterizing various circumstantial conditions that were present when the user 112 provided the spoken utterance 120. For example, the computing device 102 can include one or more interfaces and/or input devices for receiving inputs from users. At least one interface can include an audio interface that comprises one or more microphones. In some implementations, the computing device 102 can include a microphone array, and an audio processing engine of the computing device 102 can process audio data generated using the microphone array to determine a direction from which a particular user is providing a spoken utterance. For example, in response to receiving the spoken utterance 120, the computing device 102 and/or automated assistant 104 can determine that the first user provided the spoken utterance 120 from a particular direction and/or angle relative to a reference position and/or angle (e.g., −45 degrees from center, and/or Estimated_Coordinates_Meters(1.43, 3.12, 1.33)).

Additionally, or alternatively, in response to receiving the spoken utterance 120, a camera of the computing device 102 can be used to capture one or more images, with prior permission from the user 112, of the user 112 providing the spoken utterance 120. Additionally, or alternatively, in response to receiving the spoken utterance 120, a camera of the computing device 102 can be used to capture one or more images, with prior permission from the user 112, of an area around the computing device 102 before, during, and/or after the user 102 provided the spoken utterance 120. Images of the user 112 and/or surroundings of the computing device 102 can be processed at the computing device 102 to identify one or more circumstantial conditions corresponding to the spoken utterance 120 provided by the user 112. For example, in response to receiving the spoken utterance 120, the computing device 102 can process image data and/or audio data to generate circumstantial data indicating that the user 112 was standing at −30 degrees from the computing device 102 when the user provided the spoken utterance 120. Additionally, or alternatively, the circumstantial data can indicate that the second user 114 was lying down at 0 degrees and did not perform any speaking actions, or at least did not provide the spoken utterance 120.

In some implementations, other circumstantial data can be generated in response to the second user 114 providing another spoken utterance 122. The other spoken utterance 122 can be, for example, "Also, turn on some white noise at 9:30 PM." In response to receiving the other spoken utterance 122, the automated assistant 104 can cause the computing device 102 to generate data for establishing a setting that will result in white noise at 9:30 PM. Furthermore, in response to receiving the other spoken utterance 122, the automated assistant 104 can cause the computing device 102 to generate other circumstantial data characterizing circumstantial conditions in which the second user 114 provided the other spoken utterance 122.

As an example, the other circumstantial data can characterize one or more different circumstantial conditions in which the second user 114 provided the other spoken utterance 122. The other circumstantial data can characterize a location and/or posture of the second user 114, a location of the first user 112 relative to the second user, one or more motions of the second user 114 before, during, and/or after the second user 114 provided the spoken utterance, one or more motions of the first user 112 before, during, and/or after the second user 114 provided the spoken utterance, an arrangement of a room 118 in which the second user 114 provided the other spoken utterance 122, one or more actions be performed by the computing device 102 before, during, and/or after the second user 114 provided the other spoken utterance 122, and/or any other features of a circumstance in which the second user 114 provided the other spoken utterance 122.

When the action(s) requested by each user has been initialized via the automated assistant 104, the circumstantial data corresponding to each action can be stored at the computing device 102 and subsequently accessible to the automated assistant 104. In this way, one or more non-authenticated users (e.g., users that have not undertaken an authentication process directed by the automated assistant 104) can modify a respective action and/or request another action without undertaking explicit authentication at least based on the automated assistant 104 having access to the various circumstantial data. Rather, the circumstantial data corresponding to each user and/or each action can include an embedding that can be used to authenticate a particular user that is attempting to modify a previously requested action and/or initialize another action via the automated assistant 104. As an example, and as depicted in view 130 of FIG. 1B, the second user 114 can provide another spoken utterance 132, subsequent to the spoken utterance 122 depicted in view 100 of FIG. 1A. The other spoken utterance 132 can be, for example, "Never mind . . . please undo that." In some implementations, in response to receiving the other spoken utterance 132, the automated assistant 104 can cause the circumstantial conditions engine 106 to generate circumstantial data characterizing circumstances in which the second user 114 provided the other spoken utterance 132. The circumstantial data can be processed using one or more previously generated user embeddings and/or other circumstantial data in order to identify a particular user to whom the circumstantial data most corresponds.

As an example, because the second user 114 was the last user to provide a spoken utterance to the automated assistant 104, the computing device 102 can have the microphone array of the computing device 102 operate according to beamforming settings. The beamforming settings can allow audio input, sourced from an area that includes the second user 114, to be more coherent to the computing device 102 than other sources of audio in the room 118. The circumstantial data generated in response to the other spoken utterance 132 can characterize this beamforming arrangement and be used to authenticate this subsequent spoken utterance 132 from the second user 114 and/or identify an action to modify and/or initialize in response to the other spoken utterance 132. For example, the automated assistant 104 can process the circumstantial data corresponding to the spoken utterance 122 and the circumstantial data corresponding to the spoken utterance 132 in order to determine whether there is a correspondence between these instances of circumstantial data. Additionally, or alternatively, the automated assistant 104 can process the circumstantial data corresponding to the spoken utterance 122 and the circumstantial data corresponding to the spoken utterance 132 in order to determine whether there is a stronger correlation between these instances of circumstantial data than any other circumstantial data.

When a correlation between the instances of circumstantial data is identified, the automated assistant 104 can bypass requesting that the second user 114 confirm, through some gesture or other input, that they provided the request for the initializing the action being affected. In other words, instead of the automated assistant 104 providing an output such as, "Ok, please confirm the action you would like to undo, cancel, or amend," and/or "Ok, please provide the invocation phrase in order to modify the requested action." Rather, based on determining a strong enough correlation between the instances of circumstantial data, the automated assistant 104 can bypass providing such output and "undo" the previously requested action of generating white noise at a particular time. Additionally, or alternatively, based on determining that there is a correlation between the instances of circumstantial data, the automated assistant 104 can identify a previously performed action to affect in accordance with the other spoken utterance 132. In this way, the automated assistant 104 can bypass soliciting and/or processing additional inputs from the second user 114 for authenticating the request and/or identifying the action (e.g., setting a time for white noise to play) to be modified.

Figure 2:
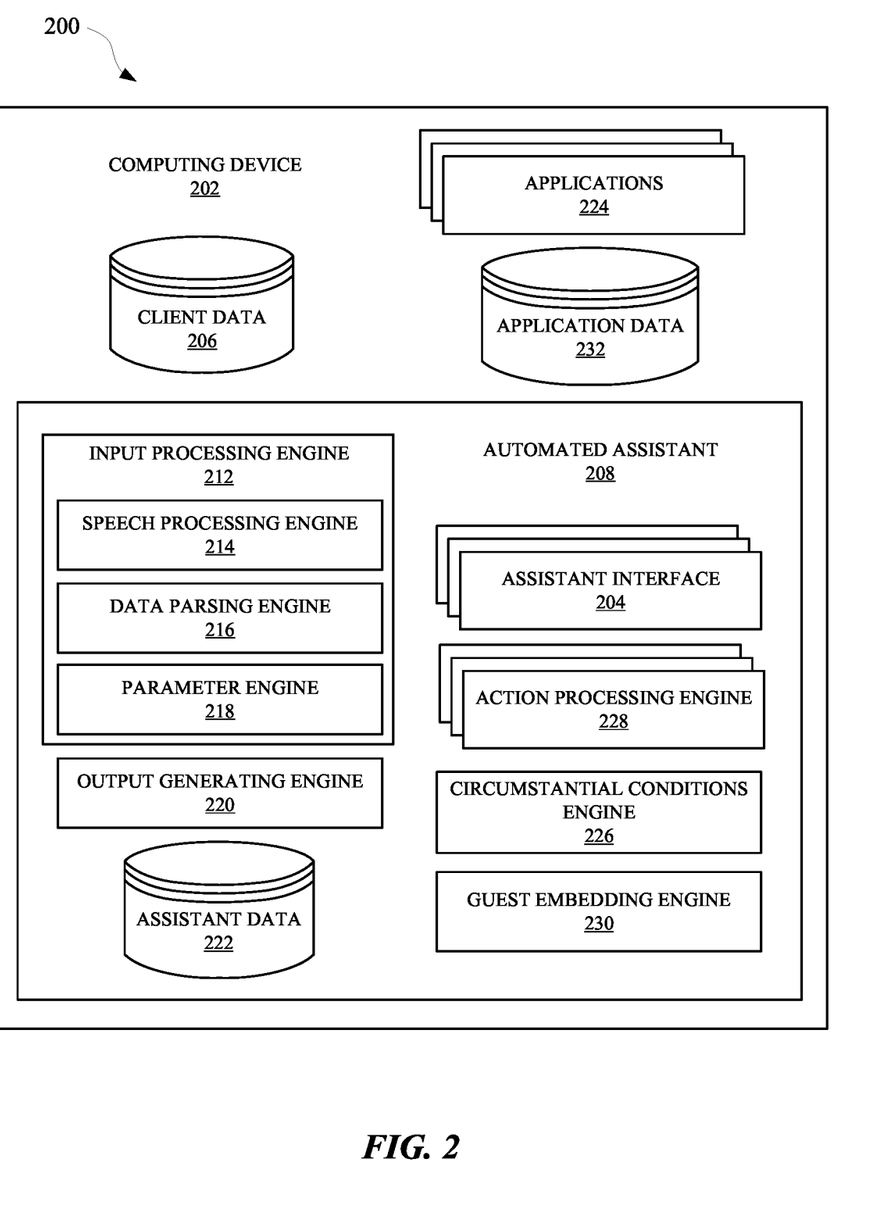
FIG. 2 illustrates a system for using circumstantial condition data to determine whether an input should affect an action that has been initialized by a particular user.

FIG. 2 illustrates a system 200 for using conditional data, generated based on circumstantial conditions of an input to an automated assistant 208, to determine whether the input should affect an action that has been initialized by a particular user. The automated assistant 208 can operate as part of an assistant application that is provided at one or more computing devices, such as a computing device 202 and/or a server device. A user can interact with the automated assistant 208 via assistant interface(s) 204, which can be a microphone, a camera, a touch screen display, a user interface, and/or any other apparatus capable of providing an interface between a user and an application. For instance, a user can initialize the automated assistant 208 by providing a verbal, textual, or a graphical input to the assistant interface to cause the automated assistant 208 to perform a function (e.g., provide data, control a peripheral device, access an agent, generate an input and/or an output, etc.). The computing device 202 can include a display device, which can be a display panel that includes a touch interface for receiving touch inputs and/or gestures for allowing a user to control applications of the computing device 202 via the touch interface. In some implementations, computing device 202 can lack a display device, thereby providing an audible user interface output, without providing a graphical user interface output. Furthermore, the computing device 202 can provide a user interface, such as a microphone, for receiving spoken natural language inputs from a user. In some implementations, the computing device 202 can include a touch interface and can be void of a camera, but can optionally include one or more other sensors.

The computing device 202 and/or other computing devices can be in communication with the server device over a network, such as the internet. Additionally, the computing device 202 and the other computing devices can be in communication with each other over a local area network (LAN), such as a Wi-Fi network. The computing device 202 can offload computational tasks to the server device in order to conserve computational resources at the computing device 202. For instance, the server device can host the automated assistant 208, and computing device 202 can transmit inputs received at one or more assistant interfaces 204 to the server device. However, in some implementations, the automated assistant 208 can be hosted at the computing device 202 as a client automated assistant.

In various implementations, all or less than all aspects of the automated assistant 208 can be implemented on the computing device 202. In some of those implementations, aspects of the automated assistant 208 are implemented via the client automated assistant of the computing device 202 and interface with the server device that implements other aspects of the automated assistant 208. The server device can optionally serve a plurality of users and their associated assistant applications via multiple threads. In implementations where all or less than all aspects of the automated assistant 208 are implemented via a client automated assistant at the computing device 202, the client automated assistant can be an application that is separate from an operating system of the computing device 202 (e.g., installed "on top" of the operating system)—or can alternatively be implemented directly by the operating system of the computing device 202 (e.g., considered an application of, but integral with, the operating system).

In some implementations, the automated assistant 208 and/or the client automated assistant can include an input processing engine 212, which can employ multiple different modules for processing inputs and/or outputs for the computing device 202 and/or the server device. For instance, the input processing engine 212 can include a speech processing module 214 that can process audio data received at an assistant interface 204 to identify the text embodied in the audio data. The audio data can be transmitted from, for example, the computing device 202 to the server device in order to preserve computational resources at the computing device 202.

The process for converting the audio data to text can include a speech recognition algorithm, which can employ neural networks, and/or statistical models for identifying groups of audio data corresponding to words or phrases. The text converted from the audio data can be parsed by a data parsing engine 216 and made available to the automated assistant as textual data that can be used to generate and/or identify command phrases from the user. In some implementations, output data provided by the data parsing engine 216 can be provided to a parameter engine 218 to determine whether the user provided an input that corresponds to a particular action and/or routine capable of being performed by the automated assistant 208 and/or an application or agent that is capable of being accessed by the automated assistant 208. For example, assistant data 222 can be stored at the server device and/or the computing device 202, as client data 206, and can include data that defines one or more actions capable of being performed by the automated assistant 208 and/or client automated assistant, as well as parameters necessary to perform the actions. Additionally, or alternatively, the computing device 202 can include one or more different applications 224, which can be accessed by the automated assistant 208, with prior permission from a user, for performing various other actions. Parameters and/or slot values for performing such actions can be provided by a user via input to one or more assistant interfaces 204 and/or stored as application data 232, client data 206, and/or assistant data 222. Furthermore, each status of each action can be stored at the computing device 202 in association with a particular user (e.g., a guest user) and/or one or more circumstantial conditions of an input provided by the particular user. In this way, explicit authentication by the particular user can be bypassed when the particular user provides subsequent inputs from a perspective having similar circumstantial conditions relative to the one or more circumstantial conditions previously acknowledged by the automated assistant 208.

As an example, a first user can provide a spoken utterance to the automated assistant 208 in order to initialize a first timer that is controlled by an application of the applications 224. In response to receiving the spoken utterance, the automated assistant 208 can employ the input processing engine 212 and/or an action processing engine 228 to determine an action and/or an application that the first user is intending to invoke. In some implementations, the automated assistant 208 can use the action processing engine 228 to determine whether a requested action is a restricted action or is a non-restricted action. For example, a restricted action can correspond to action restrictions that do not allow a guest user to control the action, whereas a non-restricted action is one that a guest user is allowed to control. The automated assistant 208 can determine that the request from the first user corresponds to an unrestricted action, and therefore the automated assistant 208 can bypass authenticating the first user. This can preserve computational resources that might otherwise be consumed processing data in furtherance of authenticating an identity of the first user.

Because the automated assistant 208 has elected to bypass authenticating the first user based on the requested action being an unrestricted action, the automated assistant 208 can use a circumstantial conditions engine 226 to generate circumstantial data associated with the spoken utterance from the first user. The circumstantial conditions engine 226 can process data from one or more assistant interfaces 204 in order to generate circumstantial data that characterizes one or more properties of a circumstance in which the first user provided the spoken utterance. For example, one or more assistant interfaces 204 can include one or more cameras, and image data generated using the one or more cameras can be processed by the circumstantial conditions engine 226 to generate circumstantial data. The circumstantial data can characterize: one or more images of one or more persons within the field of view of the camera when the first user provided the spoken utterance, a respective size of one or more faces have one or more persons within the field of view of the camera, a trajectory of one or more persons within view of the camera, mouth movement and/or other bodily movement performed by one or more persons within the field of view of the camera, posture and/or changes in posture of one or more persons, an arrangement of a room in which the first user provided the spoken utterance, a time of day in which the user provided the spoken utterance, and/or any other features that can be determined via images captured by a computing device. Any combination of any features characterized by circumstantial data can be used by a guest embedding engine 230 to generate an embedding to correlate to a particular guest user (i.e., a non-authenticated user), input, and/or action.

In furtherance of the aforementioned example, conditional data characterizing circumstantial conditions in which the first user provided the spoken utterance can include facial features and/or posture of the first user when the first user provided the spoken utterance. In some implementations, this conditional data generated by the circumstantial conditions engine 226 can be provided to a guest embedding engine 230 in order to generate an embedding to correlate to the first user and/or the first timer action.

Subsequent to the first user providing the spoken utterance for initializing the first timer, a second user can provide another spoken utterance for initializing a second timer. The second user can provide the spoken utterance without the first user knowing, thereby preventing the first user from being on notice that the second timer has been initialized. In response to the automated assistant 208 receiving the other spoken utterance, the automated assistant 208 can cause the application 224 to initialize the second timer, and also generate other conditional data characterizing circumstantial conditions in which the second user provided the spoken utterance. For example, the second user can be outside of a room in which the computing device 202 is located, therefore, a microphone of the assistant interfaces 204 can capture audio data corresponding to the other open utterance. Furthermore, a camera of the assistant interfaces 204 can capture image data that does not include the source of the audio, indicating that the second user is outside of the room. The circumstantial conditions engine 226 can process this audio data and image data to generate additional data that characterizes the second user as being outside of the room and/or having a particular voice signature. The conditional data can be used by the guests embedding engine 230 in order to generate another guest embedding for the second user and/or the second timer action.

Subsequent to the second user providing the other spoken utterance and initializing the second timer, the first user can provide a subsequent spoken utterance to the automated assistant 208 in order to cancel the first timer that first set. However, because the automated assistant 208 did not authenticate an identity of the first user that established the first timer, the automated assistant in 208 can use the embeddings stored in the assistant data 222, in order to process conditional data characterizing circumstances in which the first user provided the subsequent spoken utterance, in order to identify the correct timer to cancel. For example, the automated assistant of 208 can cause the circumstantial conditions engine 226 to generate conditional data characterizing circumstances in which the subsequent spoken utterance was provided. This conditional data, along with one or more guest embeddings, can be processed in order to identify previously acknowledged circumstantial conditions that are most similar to the most recent circumstantial conditions corresponding to the subsequent spoken utterance.

For example, the circumstantial conditions corresponding to the subsequent spoken utterance can indicate that a person standing to one side of a field of view of a camera of the computing device 202 was the source of the subsequent spoken utterance. This conditional data can be processed in order to identify a previously requested action to cancel. In some implementations, the circumstantial conditions engine 226 can determine that the most recent circumstances are most similar to previous circumstances in which the first user requested the first timer to be initialized while standing within a field of view of the camera. For example, the most recent circumstantial condition data can be processed with each embedding to generate a score for each for degree of similarity between the most recent circumstantial conditions and each previous circumstantial condition. An action corresponding to a previous circumstantial condition that is scored highest relative to any other circumstantial condition can be selected for modifying in response to the subsequent spoken utterance. As a result, the action correlated to the most similar circumstantial condition can be canceled in response to the subsequent spoken utterance from the first user. In this way, computational resources (e.g., processing bandwidth and network bandwidth) that might otherwise be consumed when incorrectly canceling certain actions can be preserved.

In some implementations, circumstantial data for a particular user (e.g., guest user) can be updated as a user continues to interact with the automated assistant and/or computing device. For example, when the user is providing a spoken utterance to an automated assistant but is not within a field of view of a camera that is associated with the automated assistant, the automated assistant can cause circumstantial data and/or an embedding to be generated that is based on the circumstances (e.g., voice characteristics, acoustic properties) in which the user provided the spoken utterance. Thereafter, the user can continue to affect any of their previously requested actions using their voice, as long as the circumstantial conditions are similar enough to the previously generated circumstantial data and/or embedding. However, should the user walk into the field of view of the camera and provide another spoken utterance, visible features of the user can be identified in image data and used to update the circumstantial data and/or embedding corresponding to the user. In other words, because the circumstantial conditions of the subsequent spoken utterance would correlate to the previous circumstantial data and/or embedding, any image data collected during the subsequent spoken utterance can be used to update the circumstantial data and/or embedding. Thereafter, should the user provide a gesture (e.g., hold their hand up to stop the automated assistant from continuing to do something) without simultaneously providing a spoken utterance, the gesture can be correlated to the updated circumstantial and/or embedding. As a result, the gesture can affect one or more ongoing actions that may be correlated to the user, the circumstantial data, and/or the embedding.

In some implementations, circumstantial data that is stored in correlation with a particular user and/or a particular requested action can be transient and/or otherwise stored temporarily. For instance, the circumstantial data corresponding to a particular action can be stored during a time that the action is ongoing and/or until the action is complete, and/or a period of time subsequent to the action completing or otherwise ceasing. As an example, circumstantial data corresponding to a guest user (i.e., a non-authenticated user) requesting a timer to go off at a particular time can be stored until the timer is dismissed, or until a period of time after the timer is dismissed transpires. Additionally, or alternatively, circumstantial data and/or embeddings for a particular guest user can be purged after some amount of "idle" time and/or inactivity time has transpired. In this way, the automated assistant would not be continually building an embedding for each guest user, but would limit such embeddings to transient situations in which a guest user is requesting services of the automated assistant. Furthermore, such storing and purging of circumstantial data and/or embeddings can be performed exclusively at a client device. Alternatively, such storing and purging of circumstantial data and/or embeddings can be orchestrated at a client device and server device.

In some implementations, a threshold degree of similarities between an instance of circumstantial data to an existing embedding can be different depending on whether an embedding corresponds to a guest user or an authenticated user. An authenticated user can be a user that has undergone steps for authenticating their identity with an automated assistant and/or computing device by, for example, audibly repeating a phrase for speech authentication, orienting themselves for undergoing facial recognition, and/or performing one or more other gestures in furtherance of generating an authenticated user embedding. Therefore, when certain circumstantial data is processed using various guest embeddings, a distance metric for each guest embedding can be generated. A particular guest user identifier can then be selected based on a determination that the distance metric for a particular guest embedding satisfies a guest embedding threshold. The guest embedding threshold can correspond a greater distance relative to another distance for satisfying an authenticated user embedding threshold. For example, the circumstantial data that is generated for a particular circumstance in which a user is providing a spoken utterance can be processed using guest embeddings and authenticated user embeddings. Although the circumstantial data may satisfy a guest embedding threshold for a particular guest embedding, the circumstantial data may not satisfy an authenticated user embedding threshold. As a result, the spoken utterance will be considered to be provided by a guest user, and will not be considered to be provided by a previously authenticated user.

Figure 3:
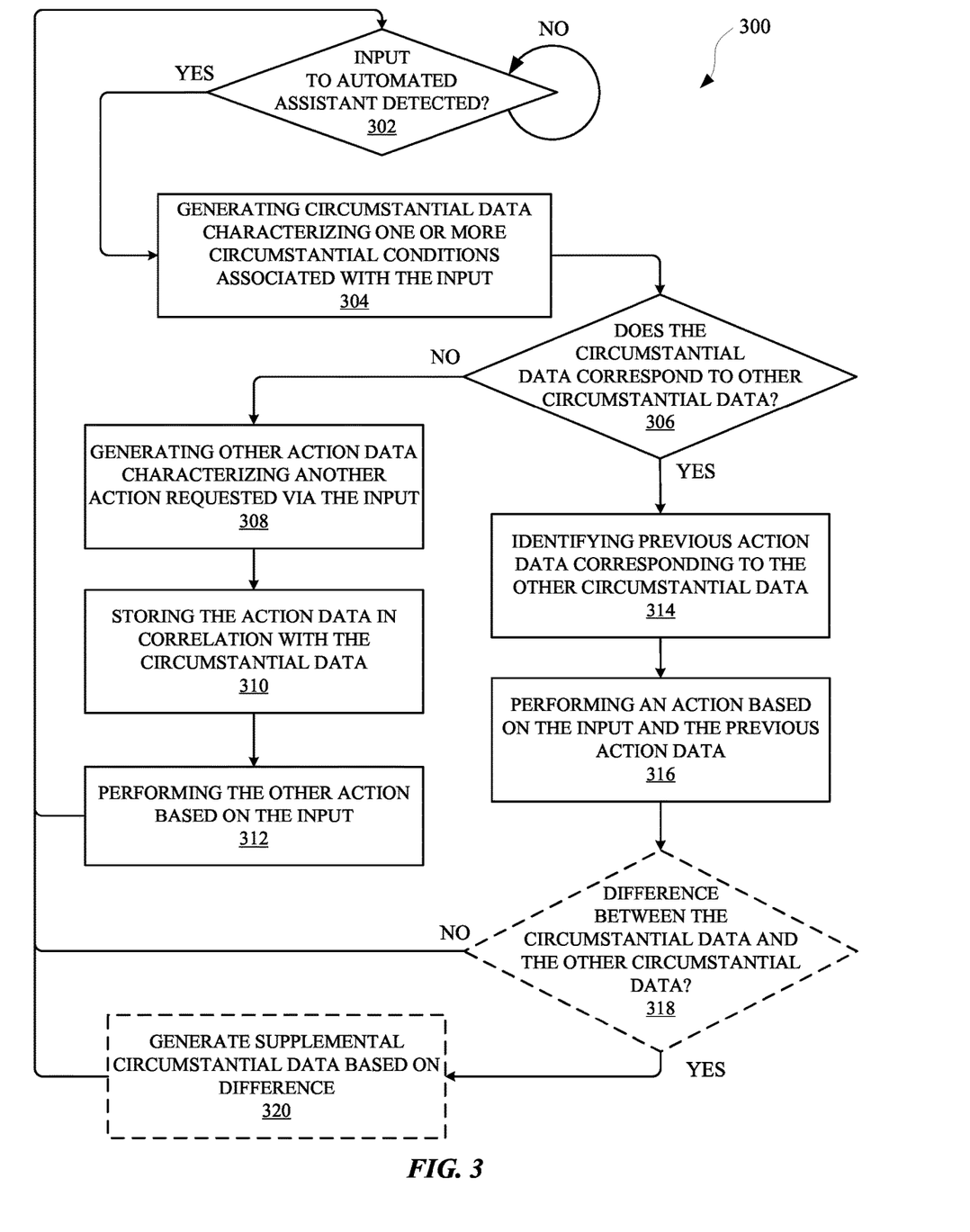
FIG. 3 illustrates a method for authenticating a user to allow the user to modify and/or initialize one or more actions based on a correlation between separate instances of similar circumstantial conditions.

FIG. 3 illustrates a method 300 for authenticating a user to allow the user to modify and/or initialize one or more actions based on a correlation between separate instances of similar circumstantial conditions. The method 300 can be performed by one or more computing devices, applications, and/or any other apparatus or module capable of interacting with a user or automated assistant. The method 300 can include an operation 302 of determining whether an input to an automated assistant has been detected. The input can be provided by a user to one or more interfaces of a computing device. For example, the input can be a spoken utterance that is received at one or more microphones that are in communication with the computing device. The spoken utterance can be, for example, "Assistant, set a reminder to call my work in an hour." When no input is detected for the automated assistant, the operation 302 can be repeated until an input is received for the automated assistant.

The method 300 can further include an operation 304 of generating circumstantial data characterizing one or more circumstantial conditions associated with the input. The one or more circumstantial conditions can be, but are not limited to, voice characteristics exhibited by the user, features of an appearance of the user, audio and/or visual details of an area in which the user provided the input, a time at which the user provided the input, a location from which the user provided the input, and/or any other information to which circumstantial conditions can be attributed.

The method 300 can further include an operation 306 of determining whether the circumstantial data corresponds to other circumstantial data. The other circumstantial data can be generated prior to the user providing the input to the automated assistant. Furthermore, the other circumstantial data can be generated in response to another input from the user and/or another user. The other circumstantial data can also characterize other circumstantial conditions such as, but not limited to, voice characteristics exhibited by the person who provided the other input, features of the appearance of the person, audio and/or visual details of an area in which the other person provided the input, a time at which the person provided the input, a location from which the person provided the input, and/or any other information to which the other circumstantial conditions can be attributed.

When the circumstantial data is determined to not correspond to the other circumstantial data, the method 300 can proceed from the operation 306 to the operation 308. The operation 308 can include generating other action data characterizing another action requested via the input. In other words, circumstantial data that is determined to not correspond to the other circumstantial data, the input can be determined to be from a different user, thereby causing the automated assistant to initialize performance of another action based on the input. The method 300 can further include an operation 310 of storing the other action data in correlation with the circumstantial data generated at the operation 304. In this way, the other action data can be referenced subsequently, should the same user in the same circumstantial conditions provide a subsequent input in order to modify the other action and/or initialize a different action.

The method 300 can further include an operation 312 of performing the other action based on the input provided by the user. For example, in response to the user providing the input, "Assistant, set a reminder to call my work in an hour," the automated assistant can generate action data characterizing the reminder and store the action data in correlation with the circumstantial data. In this way, should the user provide a subsequent input modifying the reminder, the automated assistant can compare any circumstantial data related to the subsequent input to the circumstantial data stored in correlation with the action data. Additionally, this allows the user to bypass any steps for explicit authorization before modifying the reminder, thereby streamlining action modifications and mitigating waste of computational resources.

In some implementations, at the operation 306, the circumstantial data can be determined to correspond to other circumstantial data that was generated previous to the input being detected at the operation 302. In other words, the same user that provided the input detected at the operation 302, or a different user that provided the input detected at the operation 302, may have provided a previous input that caused the other circumstantial data to be generated. Furthermore, this previous input may have resulted in previous action data being generated and stored in association with the other circumstantial data. In furtherance of acknowledging this previous action data, the method 300 can include an operation 314 of identifying the previous action data corresponding to the other circumstantial data.

In some instances, the previous action data can identify a previous action requested by the user such as, for example, to establish the reminder to place the phone call. However, in other instances, the other user may have requested that a previously set reminder (e.g., a reminder to order food delivery) be modified. For example, the previous action requested by this other user may have been established by a spoken uttering such as, "Assistant, set a reminder to order delivery food tonight." Subsequently, this other user may have provided a separate input such as, "Assistant, delete the reminder I set earlier." However, because there have been two reminders established by two different users, the automated assistant will identify the reminder to modify based on a correlation between instances of circumstantial data. When the automated assistant has identified this correlation, the automated assistant can identify the action requested by the other user, and therefore perform any request from the other user in view of the previous action.

The method 300 can proceed from the operation 314 to the operation 316, which can include performing an action based on the input and the previous action data. The input can be the spoken utterance from the other user requesting that the automated assistant delete the reminder that the other user set previously. Furthermore, the previous action data can identify the reminder that the other user set previously. Therefore, when performing the action based on the input, the automated assistant can identify the reminder for ordering delivery as the target of the subsequently requested action of deleting a reminder. However, it should be noted that if the circumstantial data did not correspond to any other circumstantial data, the subsequent input requesting deletion of the reminder would have been characterized as not relating to any previously set reminder, and therefore would not have affected any previously set reminder. In this way, errors that might otherwise occur in multi-user (e.g., multiple guests) scenarios would be mitigated by improving accuracy of correlations between various user requests and ongoing actions.

In some implementations, the method 300 can include an optional operation 318 of determining whether there is a difference between the circumstantial data and the other circumstantial data. When there is no difference between the circumstantial data and the other circumstantial data, and/or no difference that is exhibited to a degree that satisfies a correlation threshold, the method 300 can proceed from the optional operation 318 to the operation 302. However, when a difference between the circumstantial data and the other circumstantial data is identified, the method 300 can proceed from the optional operation 318 to the optional operation 320.

The optional operation 320 can include generating supplemental circumstantial data based on one or more identified differences between circumstantial data. In some implementations, the supplemental circumstantial data can be the other circumstantial data that is modified according to the one or more identified differences. In this way, as one or more circumstantial conditions of a user change over time, the circumstantial data associated with the user can be updated accordingly. This allows the automated assistant to authorize the user to provide inputs and modify ongoing actions without participating in an interruptive authentication procedure that is secondary from the user providing action request. This can preserve computational resources and network resources, as fewer authentication inputs would be processed at a respective computing device.

Figure 4:
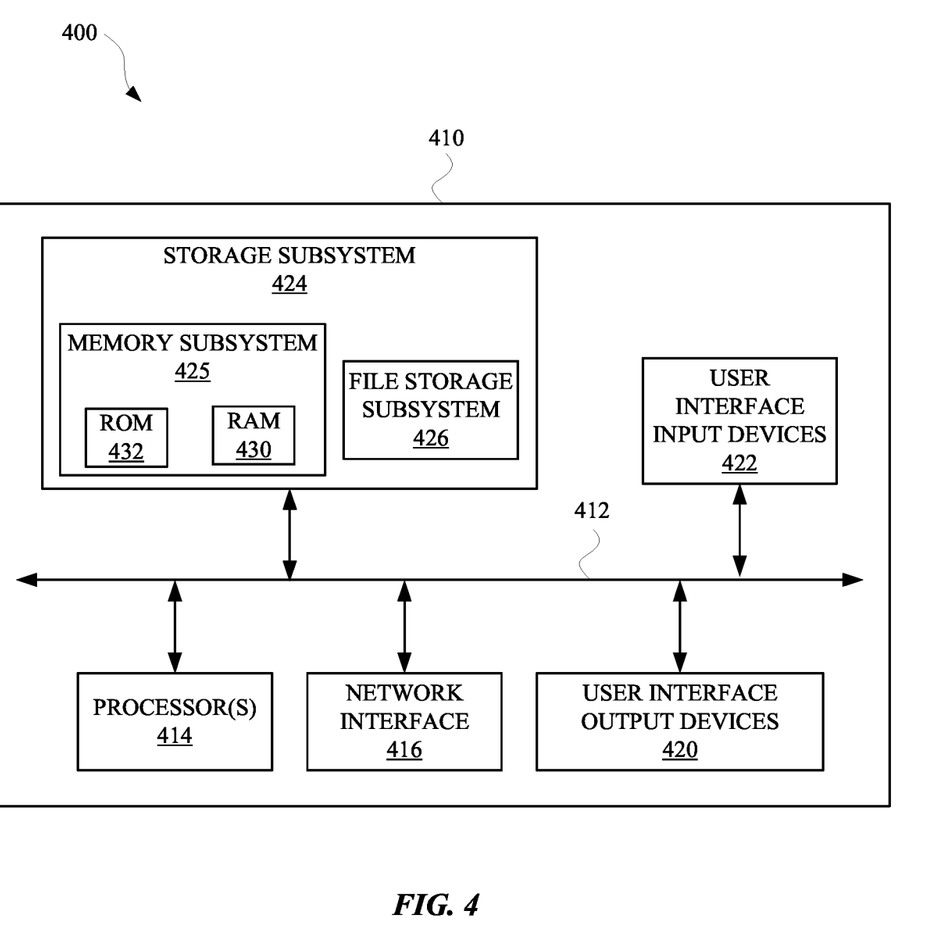
FIG. 4 is a block diagram of an example computer system.

FIG. 4 is a block diagram 400 of an example computer system 410. Computer system 410 typically includes at least one processor 414 which communicates with a number of peripheral devices via bus subsystem 412. These peripheral devices may include a storage subsystem 424, including, for example, a memory 425 and a file storage subsystem 426, user interface output devices 420, user interface input devices 422, and a network interface subsystem 416. The input and output devices allow user interaction with computer system 410. Network interface subsystem 416 provides an interface to outside networks and is coupled to corresponding interface devices in other computer systems.

User interface input devices 422 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 410 or onto a communication network.

User interface output devices 420 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 410 to the user or to another machine or computer system.

Storage subsystem 424 stores programming and data constructs that provide the functionality of some or all of the modules described herein. For example, the storage subsystem 424 may include the logic to perform selected aspects of method 300, and/or to implement one or more of system 200, computing device 102, and/or any other application, device, apparatus, and/or engine discussed herein.

These software modules are generally executed by processor 414 alone or in combination with other processors. Memory 425 used in the storage subsystem 424 can include a number of memories including a main random access memory (RAM) 430 for storage of instructions and data during program execution and a read-only memory (ROM) 432 in which fixed instructions are stored. A file storage subsystem 426 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 426 in the storage subsystem 424, or in other machines accessible by the processor(s) 414.

Bus subsystem 412 provides a mechanism for letting the various components and subsystems of computer system 410 communicate with each other as intended. Although bus subsystem 412 is shown schematically as a single bus, alternative implementations of the bus subsystem may use multiple busses.

Computer system 410 can be of varying types including a workstation, server, computing cluster, blade server, server farm, or any other data processing system or computing device. Due to the ever-changing nature of computers and networks, the description of computer system 410 depicted in FIG. 4 is intended only as a specific example for purposes of illustrating some implementations. Many other configurations of computer system 410 are possible having more or fewer components than the computer system depicted in FIG. 4.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

In some implementations, a method implemented by one or more processors is set forth as including operations such as determining, at a computing device, that a user has provided an input to an interface of the computing device, wherein the computing device provides access to an automated assistant via the interface and the input is provided by the user in furtherance of causing the automated assistant to perform an action. The operations can further include generating, based on the user providing the input to the computing device, circumstantial data characterizing one or more circumstantial conditions associated with the user requesting performance of the action. The operations can further include determining, based on the circumstantial data, whether the one or more circumstantial conditions correlate to one or more other circumstantial conditions, wherein the one or more other circumstantial conditions are characterized by other circumstantial data that is stored at the computing device in correlation with a previous action that was performed by the automated assistant before the user provided the input and in response to a previous request from a non-authenticated user. The operations can further include, when the one or more circumstantial conditions are determined to correlate to the one or more other circumstantial conditions: accessing, based on determining that the one or more circumstantial conditions correlate to the one or more other circumstantial conditions, action data that is associated with the previous action that was previously performed in response to the previous request from the non-authenticated user, and causing, in response to the input to the interface of the computing device, the automated assistant to perform the action using the action data.

In some implementations, the operations can further include, when the one or more circumstantial conditions are determined to not correlate to the one or more other circumstantial conditions: generating, based on determining that the one or more circumstantial conditions do not correlate to the one or more other circumstantial conditions, other action data characterizing the action requested by the user via the input. In some implementations, the operations can further include, when the one or more circumstantial conditions are determined to not correlate to the one or more other circumstantial conditions: storing, based on determining that the one or more circumstantial conditions do not correlate to the one or more other circumstantial conditions, other action data in correlation with the circumstantial data at the computing device.

In some implementations, the one or more circumstantial conditions and the one or more other circumstantial conditions are characterized using separate inputs to separate input modalities of the computing device. In some implementations, the circumstantial data is generated using a combination of one or more input modalities of the computing device and the other circumstantial data is generated using a different combination of one or more input modalities of the computing device. In some implementations, the interface is a microphone array that is in communication with the computing device, the one or more other circumstantial conditions are associated with a location of the user, and the method further comprises: when the one or more circumstantial conditions are determined to correlate to the one or more other circumstantial conditions: causing, based on determining that the one or more circumstantial conditions correlate to the one or more other circumstantial conditions, the microphone array to operate in accordance with a beam forming technique in furtherance of isolating subsequent spoken utterances from the user.

In some implementations, the interface is a microphone array that is in communication with the computing device, and the one or more circumstantial conditions include an image characteristic that is identified based on a light input to a camera of the computing device, and the one or more other circumstantial conditions include a position characteristic that is identified based on audio input to the microphone array. In some implementations, the operations can further include, when the one or more circumstantial conditions are determined to correlate to the one or more other circumstantial conditions: determining that the user is the non-authenticated user who provided the previous request, determining, based on determining that the one or more circumstantial conditions correlate to the one or more other circumstantial conditions, a difference between the one or more circumstantial conditions and the one or more other circumstantial conditions, and generating supplemental circumstantial data based on the difference between the one or more circumstantial conditions and the one or more other circumstantial conditions.

In other implementations, a method implemented by one or more processors is set forth as including operations such as determining, at a computing device, that a user has provided a first input to an interface of the computing device, wherein the computing device provides access to an automated assistant via the interface and the first input is provided by the user in furtherance of causing the automated assistant to perform a first action. The operations can further include generating, based on the user providing the first input to the computing device, first circumstantial data characterizing a first circumstantial condition in which the user requested performance of the first action. The operations can further include determining, at the computing device, that another user has provided a second input to the interface of the computing device, wherein the second input is provided by the other user in furtherance of causing the automated assistant to perform a second action. The operations can further include generating, based on the other user providing the second input to the computing device, second circumstantial data characterizing a second circumstantial condition in which the other user requested performance of the second action. The operations can further include, subsequent to the user providing the first input and the other user providing the second input: determining that a third input has been provided to the computing device in furtherance of causing the automated assistant to perform a third action, generating, based on the third input being provided to the computing device, third circumstantial data characterizing a third circumstantial condition in which the third input was provided to the computing device, and determining, based on the third circumstantial data, whether the third circumstantial condition in which the third input was provided to the automated assistant correlates to the first circumstantial condition or the second circumstantial condition. The operations can further include, when the third circumstantial condition is determined to correlate to the first circumstantial condition: accessing, in response to determining that the third circumstantial condition correlates to the first circumstantial condition, first action data that is associated with the first action, and causing, in response to the third input to the automated assistant, the automated assistant to provide a responsive output that is based on the first action data.

In some implementations, the first circumstantial condition and the second circumstantial condition are characterized using separate inputs to separate input modalities of the computing device. In some implementations, the first circumstantial data is generated using one or more input modalities of the computing device and the second circumstantial data is generated using other input modalities of the computing device. In some implementations, the interface is a microphone array that is in communication with the computing device, and the first circumstantial condition includes an image characteristic that is identified based on a light input to a camera of the computing device, and the second circumstantial condition includes a position characteristic that is identified based on audio input to the microphone array. In some implementations, the interface is a microphone array that is in communication with the computing device, the first circumstantial condition is associated with a location of the user, and the method further comprises: when the third circumstantial condition is determined to correlate to the first circumstantial condition: causing, based on determining that the one or more circumstantial conditions correlate to the one or more other circumstantial conditions, the microphone array to operate in accordance with a beam forming technique in furtherance of isolating subsequent spoken utterances from the user.

In yet other implementations, a method implemented by one or more processors is set forth as including operations such as determining, at a computing device, that a user has provided an input to an interface of the computing device, wherein the computing device provides access to an automated assistant via the interface. The operations can further include generating, based on the user providing the input to the computing device, circumstantial data characterizing one or more circumstantial conditions associated with the input. The operations can further include determining, based on the circumstantial data, whether the one or more circumstantial conditions correlate to one or more other circumstantial conditions, wherein the one or more other circumstantial conditions are characterized by other circumstantial data that is stored at the computing device in correlation with a previous input that was provided in furtherance of the automated assistant performing a previous action before the user provided the input. The operations can further include, when the one or more circumstantial conditions are determined to correlate to the one or more other circumstantial conditions: accessing, based on determining that the one or more circumstantial conditions correlate to the one or more other circumstantial conditions, action data that is associated with the previous action, and causing, in response to the input to the interface of the computing device, the automated assistant to perform the action using the action data.

In some implementations, the operations can further include, when the one or more circumstantial conditions are determined to not correlate to the one or more other circumstantial conditions: generating, based on determining that the one or more circumstantial conditions do not correlate to the one or more other circumstantial conditions, other action data characterizing an action requested by the user via the input. In some implementations, the operations can further include, when the one or more circumstantial conditions are determined to not correlate to the one or more other circumstantial conditions: storing, based on determining that the one or more circumstantial conditions do not correlate to the one or more other circumstantial conditions, other action data in correlation with the circumstantial data at the computing device.

In some implementations, the one or more circumstantial conditions and the one or more other circumstantial conditions are characterized using separate inputs to separate input modalities of the computing device. In some implementations, the circumstantial data is generated using a combination of one or more input modalities of the computing device and the other circumstantial data is generated using a different combination of one or more input modalities of the computing device. In some implementations, the interface is a microphone array that is in communication with the computing device, the one or more other circumstantial conditions are associated with a location of the user. In some implementations, the operations further include, when the one or more circumstantial conditions are determined to correlate to the one or more other circumstantial conditions: causing, based on determining that the one or more circumstantial conditions correlate to the one or more other circumstantial conditions, the microphone array to operate in accordance with a beam forming technique in furtherance of isolating subsequent spoken utterances from the user. In some implementations, the interface is a microphone array that is in communication with the computing device, and the one or more circumstantial conditions include an image characteristic that is identified based on a light input to a camera of the computing device, and the one or more other circumstantial conditions include a position characteristic that is identified based on audio input to the microphone array.

We claim:

1. A method implemented by one or more processors, the method comprising:
    receiving audio data that is captured via one or more microphones of a computing device, wherein the audio data captures a spoken utterance, of a user, that is directed to an automated assistant of the computing device;
    determining, based on processing the audio data:
        that the spoken utterance requests performance, by the automated assistant, of an action, and
        that the user is non-authenticated;
    causing performance of the action in response to determining that the spoken utterance requests performance of the action;
    in response to determining that the user is non-authenticated:
        storing, only transiently until one or more purge conditions are satisfied, circumstantial data and an association of the circumstantial data to the action, the circumstantial data characterizing one or more circumstantial conditions associated with the user providing the spoken utterance;
    receiving, at the computing device and prior to the one or more purge conditions being satisfied, further user interface input;
    comparing the circumstantial data, stored in association with the action, to further circumstantial data characterizing one or more circumstantial conditions associated with the further user interface input; and
    in response to the comparing indicating a threshold degree of similarity:
        causing performance of a further action that is based on both the further user interface input and the action.

2. The method of claim 1, further comprising:
    monitoring for occurrence of the one or more purge conditions; and
    in response to determining the occurrence of the one or more purge conditions:
        purging the circumstantial data and the association of the circumstantial data to the action.

3. The method of claim 2, wherein the one or more purge conditions comprise completion of the action.

4. The method of claim 2, wherein the one or more purge conditions comprise transpiring of a period of time after completion of the action.

5. The method of claim 2, wherein the storing is at only local storage of the computing device.

6. The method of claim 2, wherein the one or more purge conditions comprise transpiring of a period of time of inactivity.

7. The method of claim 1, further comprising:
    generating the circumstantial data based on the audio data.

8. The method of claim 7, further comprising:
    generating the circumstantial data further based on image data captured using one or more cameras of the computing device.

9. The method of claim 8, further comprising:
identifying the image data, to utilize in generating the circumstantial data, based on it being captured during the spoken utterance.

10. The method of claim 1, wherein comparing the circumstantial data to the further circumstantial data comprises:
determining a difference measure between the circumstantial data and the further circumstantial data; and
determining whether the threshold degree of similarity is indicated in dependence on whether the difference satisfies a threshold.

11. A computing device, comprising:
one or more microphones;
memory storing instructions;
one or more processors that execute the instructions to:
receive audio data that is captured via one or more of the microphones of the computing device, wherein the audio data captures a spoken utterance, of a user, that is directed to an automated assistant of the computing device;
determine, based on processing the audio data:
that the spoken utterance requests performance, by the automated assistant, of an action, and
that the user is non-authenticated;
cause performance of the action in response to determining that the spoken utterance requests performance of the action;
in response to determining that the user is non-authenticated:
store, locally in the memory or other storage of the computing device and only transiently until one or more purge conditions are satisfied, circumstantial data and an association of the circumstantial data to the action, the circumstantial data characterizing one or more circumstantial conditions associated with the user providing the spoken utterance;
receive, at the computing device and prior to the one or more purge conditions being satisfied, further user interface input;
compare the circumstantial data, stored in association with the action, to further circumstantial data characterizing one or more circumstantial conditions associated with the further user interface input; and
in response to the comparing indicating a threshold degree of similarity:
cause performance of a further action that is based on both the further user interface input and the action.

12. The computing device of claim 11, wherein, in executing the instructions, one or more of the processors are further to:
monitor for occurrence of the one or more purge conditions; and
in response to determining the occurrence of the one or more purge conditions:
purge the circumstantial data and the association of the circumstantial data to the action.

13. The computing device of claim 12, wherein the one or more purge conditions comprise completion of the action.

14. The computing device of claim 12, wherein the one or more purge conditions comprise transpiring of a period of time after completion of the action.

15. The computing device of claim 12, wherein the one or more purge conditions comprise transpiring of a period of time of inactivity.

16. The computing device of claim 11, wherein, in executing the instructions, one or more of the processors are further to:
generate the circumstantial data based on the audio data.

17. The computing device of claim 11, wherein, in executing the instructions, one or more of the processors are further to:
generate the circumstantial data further based on image data captured using one or more cameras of the computing device.

18. The computing device of claim 17, wherein, in executing the instructions, one or more of the processors are further to:
identify the image data, to utilize in generating the circumstantial data, based on it being captured during the spoken utterance.

19. The computing device of claim 11, wherein, in executing the instructions, one or more of the processors are further to:
generate the circumstantial data based on image data captured using one or more cameras of the computing device.

20. The computing device of claim 11, wherein in comparing the circumstantial data to the further circumstantial data one or more of the processors are to:
determine a difference measure between the circumstantial data and the further circumstantial data; and
determine whether the threshold degree of similarity is indicated in dependence on whether the difference satisfies a threshold.

* * * * *